(12) United States Patent
Gerritsen et al.

(10) Patent No.: US 7,788,218 B2
(45) Date of Patent: Aug. 31, 2010

(54) HANDLING DIGITAL DOCUMENTS IN A NETWORKED SYSTEM USING AN E-MAIL SERVER

(75) Inventors: Jeroen P. E. Gerritsen, Venlo (NL); Timotheus J. W. M. Janssen, Beuningen (NL)

(73) Assignee: OCE-Technologies B.V., Venlo (NL)

( * ) Notice: Subject to any disclaimer, the term of this patent is extended or adjusted under 35 U.S.C. 154(b) by 244 days.

(21) Appl. No.: 11/413,164

(22) Filed: Apr. 28, 2006

(65) Prior Publication Data

US 2006/0248579 A1    Nov. 2, 2006

(30) Foreign Application Priority Data

Apr. 28, 2005    (EP)    ................................. 05103513

(51) Int. Cl.
  *G06F 12/00*    (2006.01)
(52) U.S. Cl. ........................................ 707/608; 709/206
(58) Field of Classification Search ................ None
  See application file for complete search history.

(56) References Cited

U.S. PATENT DOCUMENTS

| | | | |
|---|---|---|---|
| 5,499,108 A | | 3/1996 | Cotte et al. |
| 5,881,233 A * | | 3/1999 | Toyoda et al. ............... 709/233 |
| 5,937,160 A * | | 8/1999 | Davis et al. ................. 709/203 |
| 6,020,980 A * | | 2/2000 | Freeman ..................... 358/402 |
| 6,144,997 A * | | 11/2000 | Lamming et al. ........... 709/217 |
| 6,275,850 B1 * | | 8/2001 | Beyda et al. ................ 709/206 |
| 6,343,327 B2 * | | 1/2002 | Daniels et al. .............. 709/239 |
| 6,385,655 B1 * | | 5/2002 | Smith et al. ................. 709/232 |
| 6,546,417 B1 * | | 4/2003 | Baker ......................... 709/206 |
| 6,735,623 B1 * | | 5/2004 | Prust .......................... 709/219 |
| 6,768,999 B2 * | | 7/2004 | Prager et al. ................ 707/102 |
| 6,782,387 B1 * | | 8/2004 | Kumashio ........................ 1/1 |
| 6,898,622 B1 * | | 5/2005 | Malik ......................... 709/206 |
| 6,983,308 B1 * | | 1/2006 | Oberhaus et al. ............ 709/206 |
| 7,035,853 B2 * | | 4/2006 | Umeki et al. ...................... 1/1 |
| 7,222,156 B2 * | | 5/2007 | Gupta et al. ................ 709/206 |
| 7,231,426 B1 * | | 6/2007 | Hall et al. ................... 709/206 |
| 7,333,223 B2 * | | 2/2008 | Gupton et al. ............. 358/1.15 |
| 7,386,539 B2 * | | 6/2008 | Hung et al. ..................... 707/3 |

(Continued)

FOREIGN PATENT DOCUMENTS

EP    1 215 879 A2    6/2002

(Continued)

*Primary Examiner*—James Trujillo
*Assistant Examiner*—Hubert Cheung
(74) *Attorney, Agent, or Firm*—Birch, Stewart, Kolasch & Birch, LLP (57) ABSTRACT

Digital documents are handled in networked document processing system that includes user workstations, document processing devices and a control system. A document storage is used for storing and managing digital documents associated with a user of a workstation. The control system includes a document email server where each email item in the server is linked with a digital document in the control system document storage. A processor manages the digital documents and keeps the owner of a digital document informed on the status thereof by synchronizing with the document email server so as to dynamically reflect status changes in the digital document files in corresponding email items for the owner. The workstations include a respective email client provided with at least one email folder linked to a user account in the document email server.

22 Claims, 4 Drawing Sheets

U.S. PATENT DOCUMENTS

| | | |
|---|---|---|
| 7,398,281 B2 * | 7/2008 | Atchison et al. .................... 1/1 |
| 7,565,400 B2 * | 7/2009 | Wangoo et al. ............. 709/203 |
| 2002/0019851 A1 | 2/2002 | Pollack |
| 2002/0091928 A1 * | 7/2002 | Bouchard et al. ........... 713/178 |
| 2002/0099775 A1 * | 7/2002 | Gupta et al. ................ 709/205 |
| 2002/0099777 A1 * | 7/2002 | Gupta et al. ................ 709/206 |
| 2002/0168975 A1 * | 11/2002 | Gresham et al. ............ 455/431 |
| 2003/0043416 A1 * | 3/2003 | Rublee et al. ............... 358/402 |
| 2003/0107757 A1 | 6/2003 | Gupton et al. |
| 2004/0205137 A1 * | 10/2004 | Chen et al. ................. 709/206 |
| 2005/0050147 A1 * | 3/2005 | Jani et al. .................. 709/206 |
| 2005/0076087 A1 * | 4/2005 | Budd et al. ................. 709/206 |
| 2005/0099655 A1 * | 5/2005 | Tonegawa .................. 358/1.15 |
| 2005/0193074 A1 * | 9/2005 | Garland ...................... 709/206 |
| 2006/0080278 A1 * | 4/2006 | Neiditsch et al. ................ 707/1 |
| 2006/0259566 A1 * | 11/2006 | Hyakutake et al. .......... 709/206 |
| 2007/0016647 A1 * | 1/2007 | Gupta et al. ................ 709/206 |

FOREIGN PATENT DOCUMENTS

| | | |
|---|---|---|
| EP | 1 229 724 A2 | 7/2002 |
| EP | 1 528 472 A1 | 5/2005 |
| WO | WO 01/65414 A2 * | 2/2001 |
| WO | WO-02/48900 A2 | 6/2002 |
| WO | WO-2004/013756 A1 | 2/2004 |

* cited by examiner

HANDLING DIGITAL DOCUMENTS IN A NETWORKED SYSTEM USING AN E-MAIL SERVER

CROSS-REFERENCE TO RELATED APPLICATIONS

This nonprovisional application claims priority under 35 U.S.C. §119(a) on Patent Application No. 05103513.7, filed in Europe on Apr. 28, 2005, the entirety of which is incorporated herein by reference.

BACKGROUND OF THE INVENTION

1. Field of the Invention

The present invention relates to the field of document management. In many professional environments, people have to manage documents they work with in the sense of drafting, reading, reviewing, revising, archiving, etc. In many situations, many people manage their documents manually and in physical form, in other words: by putting printed or written paper documents on their desk or in their drawers. However, when the number of documents becomes larger and larger, management of the documents becomes increasingly more difficult. One way of coping with this problem is digitizing all documents and managing the digital documents in a computer system. However, people happen to prefer working with documents in physical form, i.e., printed on paper, and they also do not like to change their often long-time habits in order to adapt to the operation of automated document management systems. Moreover, working with both hard-copy and digital documents requires frequent conversions of one type to the other and vice versa. In practice, such conversions take time and are often annoying for the users.

In particular, an embodiment of the present invention relates to a method for handling documents in a digital document processing system. Furthermore, an embodiment of the present invention relates to a digital document processing system for implementing the method and a computer program product for causing a processor to perform the method.

2. Description of Background Art

A method and system as described above is, e.g. known from EP 1 229 724. This document describes a document processing system with a plurality of document processing devices, such as printers, scanners and/or copiers. The devices are connected to a control system through a network. The system further includes workstations, such as PCs. The users of the workstations can submit print jobs to a printer in the system. Such a job is then sent to the control system through the network. The control system includes a storage for storing digital documents, e.g. documents to be printed by or documents scanned by the document processing devices. Each of the digital documents is associated with one user of the plurality of workstations (hereinafter referred to as the "owner"). For example, a print job is linked to the user who submitted the print job. A scanning job is associated to a user who has identified himself as such at the scanner console. The control system uses a processor for managing the digital documents. In this system, print jobs are normally not printed immediately, but only stored as a digital document. A user can then select a digital document locally at the console of any of the document processing devices and give a PRINT command for the selected digital document. A user can obtain information on the status of a digital document, namely, "printed" or "not printed," via the display on the console of any of the document processing devices. Furthermore, digital documents generated in a scanning operation in a device can be uploaded to a user's workstation.

The known system may thus be used to generate digital documents that can be uploaded, stored and managed in a user's workstation. However, the system is limited to scanned-in document files. Therefore, a more general approach for all kinds of digital documents is not possible. Moreover, a user must pass through several process steps in order to login to the system, select a file and upload the file to his workstation.

SUMMARY OF THE INVENTION

Therefore, there is a need for an easy-to-operate method and system for handling both digital and physical documents, converting one form into the other in an easy way, and getting access to digital documents, preferably in a way that people do not have to adapt their working habits too much.

It is an object of the present invention to provide a system and method that is user-friendly in providing information and control to a user regarding the processing of document files.

To meet an object of the present invention, a method as described above includes the steps of: operating a document email server and generating therein a respective email item for each digital document in the control system storage, the email item being linked with that digital document; enabling email clients to access the email items in the document email server through a dedicated email folder coupled to a user account in the document email server; and synchronizing the document email server and the storage, so as to dynamically reflect status changes of digital document files in corresponding email items for the owner.

The object of the present invention is also met by a document processing system including a plurality of workstations, a control system and at least one document processing device, such as a printer, scanner and/or copier, connected to the control system; the plurality of workstations and control system including respective devices for bi-directional communication through a network; each of the workstations including a respective email client; which control system includes a storage for storing and managing digital document files related to a processing operation in the at least one document processing device; each digital document file being associated with a user of the plurality of workstations (hereinafter referred to as "owner"); and a processor for, under control of a program, managing the digital document files and informing the owner of status of a digital document file associated with the owner; and the control system includes a document email server where each email item in the document email server is associated with at least one of the digital document files in the control system; each of the email clients is provided with at least one dedicated email folder linked to a user account in the document email server; and the processor is operative to synchronize the document email server and the storage, so as to dynamically reflect status changes of digital document files in corresponding email items for the owner.

According to the present invention, a dedicated email server is used, with emails in the server being linked to digital document files. The email server and job processing are synchronized to ensure that the email reflects the actual status of the corresponding document files. Status changes normally are induced by user actions, either at a workstation, such as opening the email, printing the corresponding document file, entering an item, deleting an item, moving or copying an item, etc., or at the document processing device, such as printing or scanning documents.

A dedicated folder in a user's email client is linked to the email server so that those linked emails are automatically put in the right email folder. An advantage of the present invention is that email is a tool very familiar to even novice computer users. Instead of having to access file systems that are much more unfamiliar, the user can now simply check the email. Moreover, changes in status can be reported automatically using conventional email reporting. Having obtained access to the emails, e.g. by logging in on a PC in a conventional way, the user is automatically authorized to obtain status information on document files. No dedicated authorization system is required.

Each document processing job, e.g. printing or scanning, automatically causes an email being delivered in the dedicated folder of the email client of the owner of the document. Since the email is linked to the digital document, the owner now has easy access to the document, so that the owner may, e.g., easily upload it to a workstation. Also, the owner can move the email to other folders of the email client that may be reserved to a particular activity to which the linked digital document is related. The inventors have realized that nowadays users frequently use their email client as a de-facto document management system with custom folders related to all kinds of activities. The present invention provides a simple method of adapting all documents a user works with to a format that can be handled in an email application, and thereby enabling entry of documents in a de-facto document management system. Furthermore, as long as a document-linked email item remains in the dedicated email folder, it is also updated to always reflect the actual status of the associated document.

In an embodiment of the present invention, the link between the email item and the digital document is implemented in the form of a copy of the digital document being attached to the email item. In this way, access to the digital document from the workstation is easily achieved by simply downloading the attachment of the email item.

It should be noted that it is known from Research Disclosure Journal, database number 472070 "Smart printer email image attachments" by Jimmy Sfaelos and Samuel Lester to send a print job to a network printer as an email, where the document to be printed is an attachment to the email. A return email may be sent to the user for proofing with pricing options and to enable a user to complete printing instructions.

It is known from U.S. Pat. No. 5,499,108 to provide a scanned document to a user as an attachment to an email. Both systems use conventional email clients and no special server is used that is kept synchronized with the document processing jobs. Consequently, no up-to-date status information is available and no automatic generation of linked emails for every new document is assured.

In an embodiment of the present invention, the storage and the document email server are also synchronized to reflect manipulation of an email item in the dedicated email folder of an email client in a processing operation on the corresponding digital document file.

Instead of having to use unfamiliar, apparatus-specific system commands, the present invention presents the user with a simple way of controlling digital documents in the form of manipulating emails.

In an embodiment of the system, the processor is operative to synchronize with the document email server to detect a manipulation of an email item in the document email server and in response changing the status of the digital document file associated with the email item in dependence on the manipulation. In this way a manipulation of an email directly affects the involved digital document. Manipulation may, e.g., include PRINT and DELETE functions.

In an embodiment of the system, the processor is operative to delete a digital document file in the storage in response to determining that an email item associated with that digital document has been removed from the dedicated email folder of a user.

In an embodiment of the system, the processor is operative to create a digital document file in the storage in response to determining that an email item has been inserted in the dedicated email folder of a user. In the system according to the invention, dragging or copying an email to the dedicated folder automatically results in the creation of a digital document file in the storage of the control system that may later be printed. If so desired, documents other than emails can be printed by inserting an email with that document as an attachment into the dedicated email folder.

In an embodiment of the system, the at least one document processing device includes a digital document print system provided with a local user interface and wherein the processor is operative to update the status of a digital document stored in the storage in response to a user creating a print job relating to said digital document at said local user interface.

In an embodiment of the system, the at least one document processing device includes a digital document scan system and the processor is operative to create an email item in the document email server in response to a user creating a scan job, where an attachment to the email item includes a digital document generated by the scan system.

In an embodiment of the system, the at least one document processing device includes a digital document copy system including a scanner and a printer and the processor is operative to create an email item in the document email server in response to a user creating a copy job, where an attachment to the email item includes a digital document generated by the scanner. These are simple and straightforward ways of providing the scanned/copied document to the user in an electronic form without having to use unfamiliar tools.

In an embodiment of the system, the at least one document processing device has a local user interface for commanding operations involving digital document files, said local user interface being connected to the control system for manipulating digital document files stored in the storage. According to this embodiment, digital documents of a user may be acted upon from the document processing device as well as from the email client, although possible action may differ.

In an embodiment of the system, the processor is operative to indicate a type of digital document in terms of a related processing job, such as print job, scan job, copy job, in a field of the associated email item. In an embodiment of the system, the processor is operative to extract a title of a digital document and to specify it in a field of the associated email item. In an embodiment of the system, the processor is operative to extract the content of a digital document and to specify it in a field of the associated email item. In an embodiment of the system, the processor is operative to specify a time of submission of a digital document in a field of the associated email item. Each of these aspects helps the user in identifying a digital document in the list of emails. This can thus aid in identifying a digital document of which the user wants to know the current status of and/or a job that a user wants to control. It can also aid in retrieving emails related to digital documents that the user has archived and wants to retrieve at a later stage, such as archived print proofs, scanned documents or copied documents.

In a specific embodiment of the present invention, a digital document may be printed together with the associated email item, wherein the email item is printed on a larger sheet of paper, such that the latter may be folded around the printed document to form a folder or wrapper. In a special case, one email item may be associated with a plurality of digital documents, in which case the wrapper may be folded around all the printed documents, thus forming a handy dossier.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
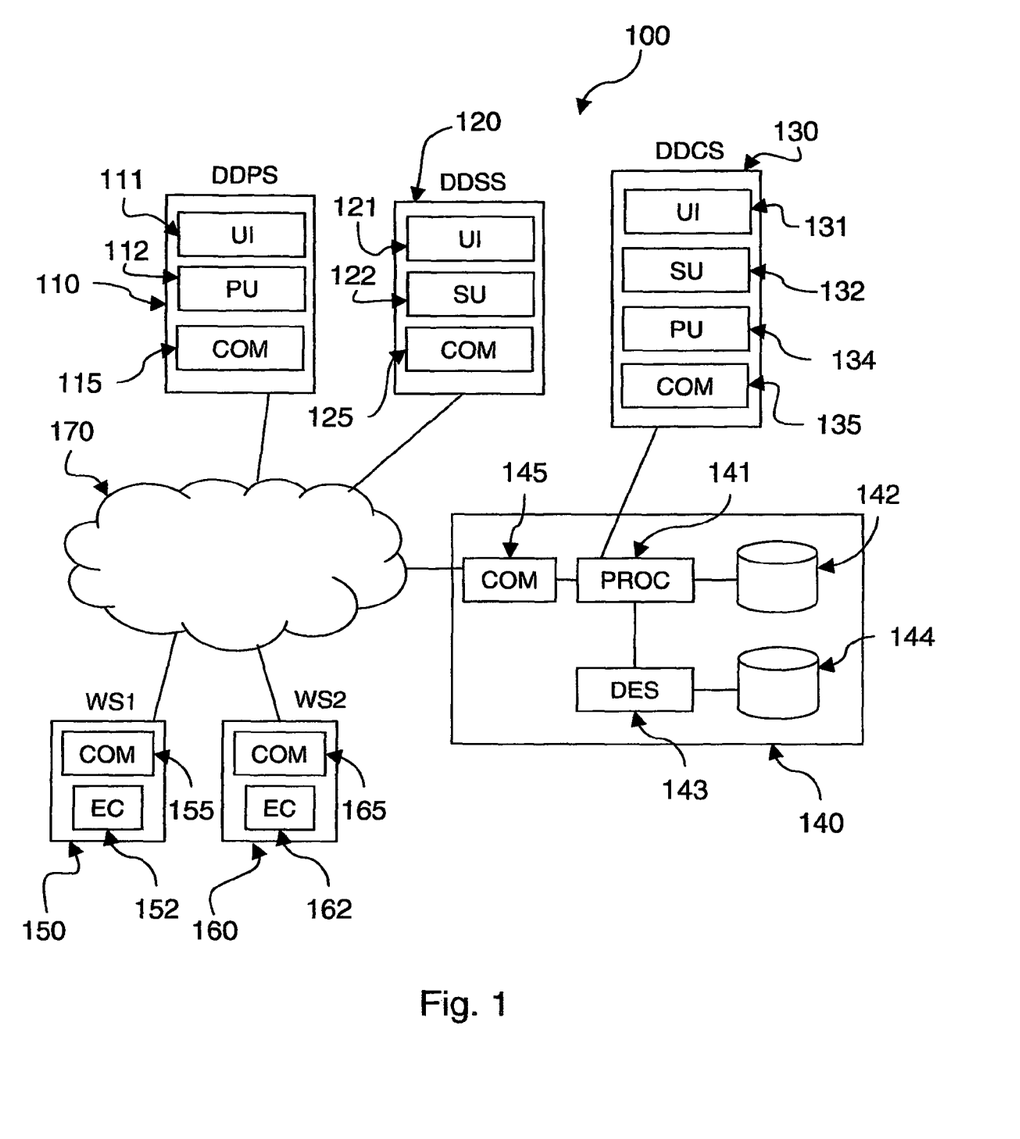
FIG. 1 shows a block diagram of a system according to the present invention.

FIG. 1 shows a block diagram of an exemplary document processing system 100 according to the present invention. The document processing system 100 includes at least one document processing device, such as a printer, scanner and/or copier, a plurality of workstations 150, 160, a control unit or server 140, and a network 170 for connecting the respective devices with each other.

In the system of FIG. 1 three exemplary types of document processing devices 110, 120 and 130 are shown. Suitable document processing devices that may be used are, for example, the Oce VarioPrint® 20×0 series of digital copiers. All of the devices have respective user interfaces 111, 121, 131 provided with a display and an operating device such as keys, and respective devices 115, 125, 135 for bidirectional communication through the network 170. The digital document print system 110 includes a printing unit 112, such as a laser printer. The digital document scan system 120 includes a scan unit 122, for example a color scanner. The digital document copy system 130 includes a copying unit that is composed of a scan unit 132 and a printing unit 134 that can also be used separately. It will be appreciated that each of the document processing devices is controlled by a built-in control unit (not shown) that is microprocessor based and operated under suitable control software. The document processing device may also include storage (not shown) for storing digital documents, such as documents to be printed, documents that have been scanned, or documents that are in the process of being copied.

The document processing system 100 further includes a plurality of workstations. In FIG. 1, workstation 150 and 160 are illustrated. The workstation may take any suitable form, such as a Personal Computer (PC), laptop, or mobile handheld device (e.g. Personal Digital Assistant (PDA), mobile phone, or digital camera). Typically, such workstation will include a processor for controlling the workstation and for performing user applications, a user output device (e.g. display), a user input device (e.g. keyboard, or mouse), a working memory (e.g. RAM), a storage device (e.g. hard disc, solid state memory like flash) for storing programs for controlling the processor and for storing digital documents to be provided to or received from at least one of the document processing devices. Those components of the workstations are well known and not shown in FIG. 1. Each of the workstations 150, 160 also includes a respective email client 152, 162. The email client is preferably a conventional email client, like Microsoft's Outlook® or Outlook® Express, using a suitable conventional email protocol (such as IMAP, Microsoft® Exchange or HTTP) for communicating to one or more email servers. The plurality of workstations 150, 160, the document processing devices 110, 120, 130 and the control system 140 (described in detail below) include respective devices 155, 165, 145, 115, 125, 135 for bi-directional communication through the network 170. The network may use any suitable medium technology, such as a wired network (e.g. an Ethernet®) or a wireless network (e.g. WiFi®, Bluetooth®, etc.). The higher level protocols may be from the TCP/IP suite of protocols as used for the Internet. The communication devices 155, 165, 145, 115, 125, 135 may be implemented using conventional hardware and/or software.

The control system 140 includes a processor 141, a document email server 143 and storages 142 and 144. The storage 142 is for storing and managing digital document files and related document processing jobs for the document processing devices 110, 120, and 130. Generally in the context of the present invention, a digital document file is related to a processing job. Namely, a digital document file is related to a print job for printing a digital document to produce a physical document or a scan job for scanning a physical document, thereby generating a digital document file, or a copy job composed of a scan job and a print job in series. In the following, the term "job" will be used for the combination of a digital document and its related processing job, unless otherwise indicated.

Each job/digital document is associated with a user of the plurality of workstations. Such a user will be referred to as the "owner". To maintain this association, the storage 142 may store for each job a field that includes the association. The control system may be built using conventional hardware and software, such as is known for computer server systems. Under control of a suitable program, the processor 141 manages the jobs stored in the storage 142. The program may also be stored in the same storage 142 or in another, preferably non-volatile, memory. To be able to manage the jobs, the control system 140 is connected to each of the document processing devices. The connection may be implemented in any suitable way. FIG. 1 shows as an example a 1-to-1 link between the control system 140 and the document processing device 130. Such a link may be proprietary. Alternatively, a network connection 170 may be used, such as shown in FIG. 1 for the document processing devices 110 and 120. In this example, the same network medium is used as is used for the communication between the workstations 150, 160 and the control system 140. It will be appreciated that the network technology may be a hybrid, where the different technologies may be coupled using conventional techniques, such as bridges, routers or gateways. The control system 140 can submit a digital document to a document processing device (e.g. to device 110 or 130) and/or receive a digital document from a document processing device (e.g. from device 120 or 130) via the connection(s).

As part of a print job, the job owner may have indicated/selected a processing device. This may be done in any suitable way. For example, a user may specify/select a printer by identifying the printer by name in a list of selectable printers, or by specifying properties of the printer or print job, such as color, high quality, high speed, etc. The control system 140 then uses this information to send the print job to a suitable printer. If the printer is not fully identified (e.g. specified by properties), the control system may select an appropriate printer.

Alternatively, the system may be laid out in such a way that print jobs are submitted from the workstations directly to a selected printer and that each printer reports all received jobs to the control system 140.

It should be noted that in itself it is known how a control system can control one or more document processing devices and keep fully up-to-date (synchronized) with an actual status of jobs being processed by the document processing devices. An example of such a system is the Oce Intra Logic® utility. The control system 140 may, but need not, have a user interface enabling an operator or a user to control the control system 140 directly. Furthermore, the control system 140 may be implemented as a separate device, but also be incorporated in a document processing device, or even, as a distributed system, in all of the document processing devices.

Within the context of the system, digital document files for printing which are submitted to a document processing device via the network for printing are either of a first type or a second type. Files of the first type are required to be printed directly, i.e. without further action on the part of an operator at the apparatus, while files of the second type are required only to be stored in the memory of the device and not to be printed until an operator explicitly so requests at the local user interface of the device by selecting a file and starting a print process for it. The type of file involved is apparent from an attribute added to the file.

Processing of a data file of the first type is further referred to as automatic printing (AP) and involves a print queue in the device.

Processing of a data file of the second type is referred to as interactive printing (IP) and is also known as "Mailbox printing." The procedure of Mailbox printing is described in applicant's patent EP 1229724 and summarized hereinafter.

When a file for printing of the second type is received at a printer or the control system 140, whatever the case may be, a number of predetermined meta data, such as the name of the owner and the name of the file itself, is extracted from the file and stored in a list maintained in an administration system. The file itself is then stored unchanged in a storage unit in the receiving device in connection with the name of the owner. The storage unit together with the administration system form, as it were, a set of "logic storage spaces," hereinafter called "Mailboxes," for document files. Each Mailbox is allocated to one user. When an operator of the printer wants to print a particular document file, the operator calls up the list of received document files by pressing an appropriate key at the user interface of the printer device. The list of document files is then automatically displayed, sorted by owner name.

Figure 4:
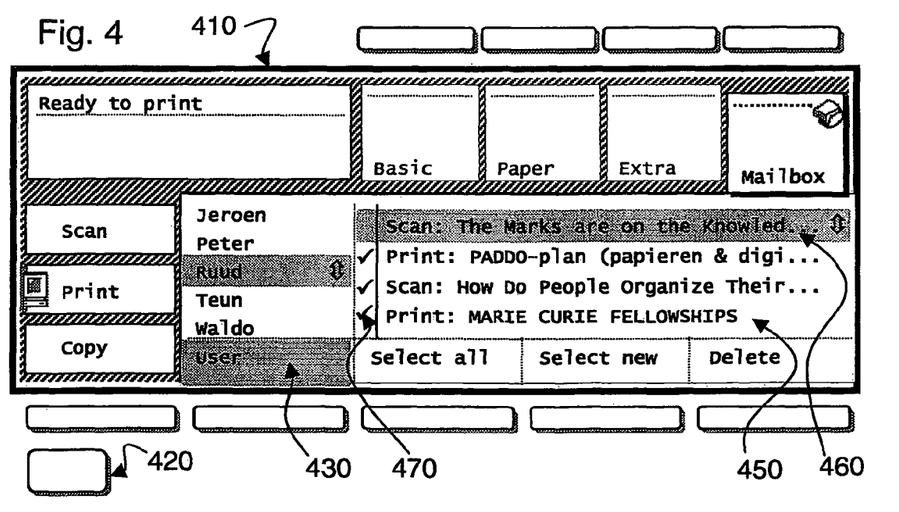
FIG. 4 shows an operator control panel of a document processing device suitable for use with the present invention.

Reference is made to FIG. 4, showing the user interface operator control panel of a document processing device, with a display 410 and operating keys including a START/PRINT key 420. In the display, there is shown a list 430 of users of which one ("Ruud") is selected and for this user a list of documents 450 is shown. The operator may then select an intended document file 460 in the list and start the printing process by pressing the START/PRINT key 420 on the user interface. When a document file of the second type has been printed, it remains stored in the storage unit until it is removed by the owner. It remains selectable for printing, although it is marked, for instance with a tick sign 470, to show it has been printed. Document files in a Mailbox are sorted by submission time.

The present invention is primarily intended for use with print document files of the second type (IP), since such files are in principle permanent. The invention may, however, also be applied for files of the first type (AP), although such files are normally alive only as long as they are present in the print queue. The latter also applies for queue-based automatic print systems that are generally available.

The principle of "Mailboxes" may also be used in document scanning. As also described in applicant's patent EP 1229724, a scanning session may start with a user identifying himself at the local user interface of a digital copier device, e.g. by entering an identification code. Then, a document may be scanned and the scan data file is automatically stored in the memory of the device under the name of the user, that is, in the user's Mailbox. The user may now go back to a workstation, login to the copier device and ask for an overview of the scan files in the Mailbox. One or more of the files can be selected and downloaded to the workstation. Mailbox scanning is also contemplated by the inventors of the present invention.

The working of the present invention will now further be explained for a system in which jobs (digital document files) are all stored in the control system 140. An alternative system architecture, in which document files are stored in the document processing devices themselves and the control system is only used for coordination, is considered straightforward for the skilled person. This embodiment is included in the present invention and is encompassed by the appended claims.

According to the present invention, the user is kept up-to-date on the actual status of his jobs through emails. To this end, the control system 140 includes a dedicated document email server 143 and associated storage 144. An email item in this document email server 143 is associated with at least one of the jobs in the control system (e.g. with the associated document being stored in the storage 142 and its status being monitored by the processor 141). The email clients 152, 162 are each equipped with at least one email folder linked to a user account in the document email server. In this way, emails related to a job status in the document email server 143 are visible through the email clients used by the owner of the digital document. User accounts and access to emails can be controlled in the conventional way as known for email servers. The processor 141 is programmed with software that lets the processor synchronize with the document email server to issue and dynamically update a status email according to the actual status of the associated job. Advantageously, the processor 141 not only executes software for controlling (and synchronizing with) the document processing devices but also software for the email server. This simplifies synchronization significantly. The software for synchronizing the actual document status with the associated emails may take the form of a plug-in in the email server.

Figure 2:
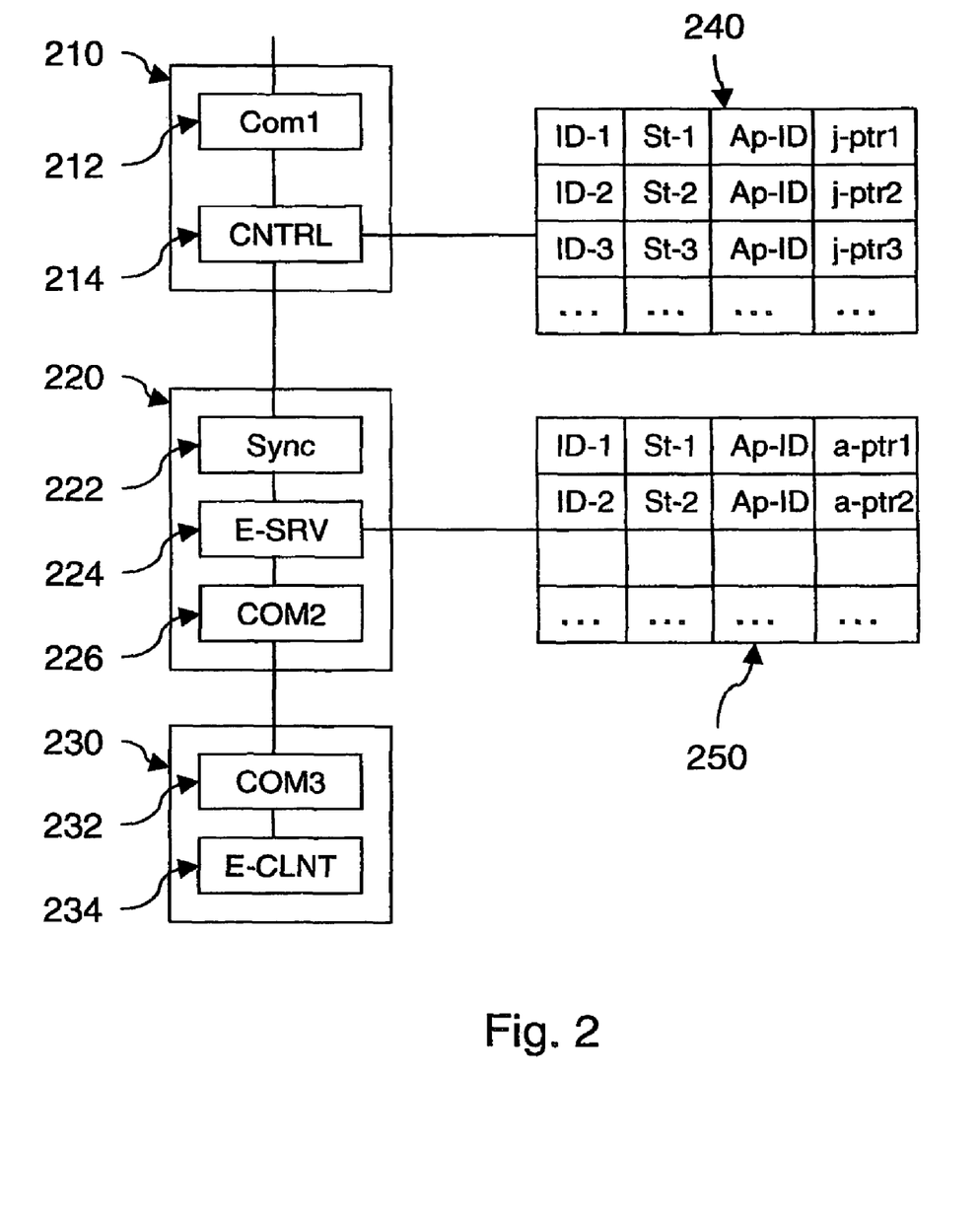
FIG. 2 shows a software architecture for performing the method according to the present invention.

FIG. 2 illustrates an exemplary arrangement of the software into main software modules with the program instructions for performing the described functions. It will be appreciated that a skilled person may design other implementations for the same purpose.

In the exemplary arrangement of FIG. 2, the control system 140 has two main software modules 210 and 220. Module 210 is in principle conventional and deals with controlling the document processing device(es). In the arrangement of FIG. 2, this module is subdivided in a lower level module 212 for communication to the document processing device(es) and a higher level (application level) module 214 for performing the actual control and monitoring of status. Clearly, module 210 will use data for performing the control and monitoring. Block 240 shows part of the data that may be maintained. In this example, each row of block 240 stores data relating to one job being maintained by the control system. For each job, a job identifier (e.g. name or number) may be maintained. Job identifiers ID-1, ID-2 and ID-3 are shown. Typically, at least one status field will be maintained for each job. The status field may represent the last known status of execution of the job by the document processing device. The control system 140 may obtain this from the document processing device in any suitable way, for example through polling or on an interrupt-basis. For the three mentioned jobs, the status field is St-1, St-2, ST-3, respectively. For a print job, such a status might be: stored, printing, printed, error, etc. For a multi job-type system an additional field may also be used that covers the job-type, such as print, scan, copy. The actual digital document file that is part of a job also has an identifier, such as a document name/title. Such a document identifier can be seen as an appendix to the job identifier. For the three mentioned jobs, the appendix identifier is Ap-ID1, Ap-ID2, Ap-ID3, respectively. In the situation where there is more than one document for a job, another arrangement than the simple construction in FIG. 2 will be required (e.g. using more document fields per job, using more rows per job, using pointers to allow dynamic lists, etc.). Such techniques are well-known. The fields described so far can easily be maintained in main memory, such as DRAM. Since the actual documents may be relatively large, FIG. 2 shows an arrangement where the document is stored in background memory, such as storage 142 of FIG. 1. A pointer to this document (e.g. file identifier or URL/URI) may be stored in the block 240. For the three mentioned jobs the pointers are j-ptr1, j-ptr2, j-ptr3, respectively.

Module 220 deals with the role of the document email server 143 of FIG. 1. The core email server software is indicated as item 224. This module 224 may be conventional. Block 250 illustrates data that may be maintained for the emails in the server. The data of block 250 are stored in memory 244 (FIG. 1), which need not be a physically separate memory.

Again, a simple arrangement is shown for the purposes of explanation. More complicated arrangements may be used and in itself the email server and its data may be conventional. In the example, a row of data is used for each email. Each row includes an email identifier. Ideally, the email identifier matches the job identifier to which it corresponds. Alternatively, a straightforward mapping mechanism may be used to link emails in block 250 to jobs in block 240. In the example of FIG. 2, email identifiers ID-1 and ID-2 are shown. Further conventional email fields, such as sender, receiver, subject, etc. are present. A discussion will be given below on how these fields may be used in the system according to the present invention.

Module 222 represents the program instructions for ensuring that the email data in block 250 represents the job status information in block 240. Module 222 thus takes care of synchronization between the conventional control role and the email representation. The synchronization module 222 may be implemented as a plug-in in the email server 224. This provides full access to and control over the emails. The synchronization module 222 may use any mechanism for keeping up-to-date with changes in the job status in order to update the corresponding email or, in response to a change in an email, updating the job status. For example, polling or triggering (e.g. interrupt) techniques may be used.

Module 226 represents the software used by the email server 224 to communicate with email client(s). This software may be conventional and may include suitable network protocols.

Main module 230 represents software in a client, i.e. a workstation like station 150 or 160 in FIG. 1. This software may also be conventional. It may include a sub-module 232 for the communication with module 226 of the server and a sub-module 234 that represents the actual email client, such as Microsoft Outlook®.

According to the present invention, a change in the Mailbox of a user in the control system 140 or, as the case may be, in any of the document processing devices 110, 120, 130, is reported to the workstation where the user is logged in in the form of an email. In particular, when a new digital document file (job) is entered in the user's Mailbox, a corresponding email item is created in the dedicated email server 143. A new digital document file may be entered in a Mailbox in any of the following ways, it being understood that the list below is given for explanatory purposes and is not necessarily complete:

(a). a digital document for printing is submitted from the user's workstation and stored in the user's Mailbox in storage 142.

(b). a digital document file has been created in a scan process in one of the document processing devices after the user has identified himself at that device, and stored in the user's Mailbox in storage 142.

(c). a digital document file has been created in the scanning stage of a copy process in one of the document processing devices after the user has identified himself at that device, and stored in the user's Mailbox in storage 142.

(d). an email with attached digital document is received by the email server 143 from the user's email client.

(e). an email with attached digital document is moved (dragged) from another email folder in the user's email client to the dedicated email folder in that client.

In such cases, the present invention makes use of the conventional email process in which clients automatically report the action to the server, which updates the relevant account. In case the other email folder is linked with the above-mentioned general email server in the network, which is different from the dedicated email server 143, a file transfer must take place from the general email server to the dedicated email server 143 (it is noted that not every email system existing today is suitable for this operation, but many are).

In the latter two cases, the attachment of the email is automatically interpreted by the email server 143 as a digital document to be stored in the Mailbox in storage 142.

The conventional fields of email items may advantageously be used to represent properties of the digital documents and related processing jobs, such as indicated in block 240 of FIG. 2. The processor 141 is programmed to represent at least one of the following properties of a digital document in a field of the email item associated with the digital document:

(a). Owner of the digital document. This may, for example, be inserted in the sender (or receiver) field of the email.

(b). Type of the related document processing job (e.g. print, scan, copy). For example, this may be indicated in the subject field of the email. If the subject field represents more than one property, the job type is preferably the first element (enabling quick identification of digital documents of a same type, for example by sorting on the subject field.)

(c). Title of the digital document. This may also be indicated in the subject field, for example following a description of the job type. The document title may be obtained in many ways. For example for a print job, a name of a file to be printed may be used, a title may be taken from metadata in the document, or the document content may be analyzed for suitable words that may represent the content (e.g. first words, first words in a heading style, etc.). Document analysis itself is known. If the document is not yet in a 'textual' form, e.g. when the document is a scan file, first OCR (optical character recognition) techniques may be used. If no title can be found, a default title may be indicated, such as "no title" or "unknown title".

(d). Representation of content of the document. This may be indicated in the main body of the email. The representation may take any suitable form, such as the first lines or graphical elements of the document, or a thumb-nail representation of a page (e.g. first page) of the document.

(e). The full content of the digital document. This is preferably put in an attachment of the email item. For a print job, this may be a print proof (i.e. actual image that was (or will be) printed). For a scan job, this may be the actual document. Preferred attachment formats are PDF and TIFF, since those are universally used. The document may be in any suitable representation, such as graphical, textual or combined (e.g. shown in a graphical representation as printed/scanned, but selectable as if it was textual). Advantageously, the attachment name may be the same as the document name.

(f). The time of submission of the related document processing job. This may for example be inserted in the date/time field of the email item.

(g). Additional properties such as the number of pages, and (for a scanned document) whether these pages were scanned single sided or double sided, may also be inserted in the main body of the message.

Figure 3:
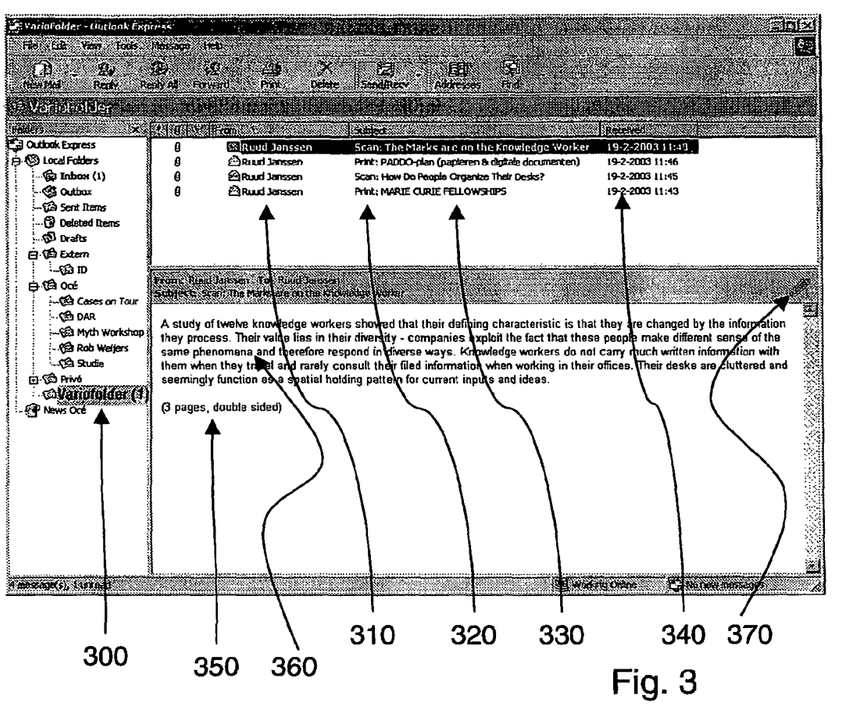
FIG. 3 shows a user interface according to the present invention enabling a user to obtain status information on digital documents and manage related document processing jobs through an email client.

FIG. 3 illustrates these concepts on an exemplary user interface of an email client (in this case Microsoft Outlook® Express). Item 300 indicates the folder that is linked to the document email server according to the present invention (the other folders are linked to another, general email server (not shown) that is also accommodated in the network environment but has no particular function related to the invention). In this example, one folder named Variofolder is used. All digital documents for processing in all document processing devices are represented in this folder. It will be appreciated that more folders may easily be used, for example a folder per device. If so desired, more than one controlling system may also be used, where each controlling system may be linked to one folder. Item 310 indicates the owner of the digital document, being the user that has logged on using this email client. For scan jobs controlled at the scanning system, the user may need to identify himself as the user of the computer/email system. In this example, the user is indicated in both the sender and receiver field. Items 320 and 330 indicate the subject field. In this case, item 320 shows the job type and item 330 shows the digital document name.

The attachment of the presently selected digital document may be displayed when the user clicks on the attachment sign 370, as is well-known to users of the exemplified MS Outlook Express application. Preferably but not necessarily, the name of the attachment is the same as that of the digital document itself. Clicking on the attachment sign 370 opens a menu enabling the user to download the attachment to his workstation.

It will be appreciated that a job may involve more than one document in which case there can be more than one attachment. Item 340 indicates the time of processing of the job, i.e. the time of submission of a print job or the time of scanning of a scan job. Items 350 and 360 show parts of the main message body. Item 360 represents part of the content of the document. Item 350 covers miscellaneous other properties, including the number of pages of the document.

In an embodiment of the present invention, an owner of a digital document in a Mailbox is enabled to control the document through manipulation of an email item in a dedicated folder, that is associated with the document. The manipulation may include those known from conventional email clients like deleting, printing, creating, copying, moving, or forwarding an email.

The manipulation of an email item in the client affects the corresponding email item in the email document server 143. Preferably, the processor 141 is programmed to synchronize with the email document server 143 to determine the manipulation of an email item in the document email server. Referring to FIG. 2, this detection is performed by synchronization module 222. In response to determining a manipulation of an email item in the server, the processor 141 updates the status of the digital document stored in the user's Mailbox and associated with the email item. The status update depends on the type of manipulation. It will be appreciated that an email item may be associated with more than one document processing job.

For instance, the following email manipulations controlling the following status update (=action) may occur:

(a). Removal of email item associated with a print job from the email folder of a user: delete the associated digital document.

(b). Insertion of an email item associated with a print job in the email folder of a user: create a digital document including the email item and/or attachments of the email item.

(c). Change of sequence of email items associated with document files in the email folder: re-position the involved digital documents in the Mailbox representation in the user interface of the document processing device to reflect the sequence in the email folder.

(d). Printing of a digital document in the Mailbox of a user, by actuating the print key at the printer console, may be marked in the corresponding email item in the list of that user's email client. The marking is synchronized with the tick sign 470 in the console display of the printer (FIG. 4). For a practical implementation, use may be made of the already existing possibilities of present email clients, such as placing a flag sign.

It will be understood that persons skilled in the art may associate other actions controllable by the control system with manipulations on email items.

It is noted that currently most email clients do not enable a user to freely change the sequence of email items. A user may sort or filter emails based on certain criteria. Future email clients may support free changing of the sequence. This functionality can already be supported now by incorporating this functionality in a new email client or through a plug-in in an existing email client.

Other email manipulations contemplated by the inventors are copying or moving a document-related email from the dedicated folder 300 to any of the other folders of the user's email client. If the other folder is not linked to the dedicated email server 143, but to the above-mentioned general email server in the network, this will involve a transfer of the email item, with the attached copy of the document, from the email document server 143 to the general email server. This manipulation gives the user the opportunity to use his email client as a document management system, since additional folders may be used to store document-related email items in groups.

Figure 5:
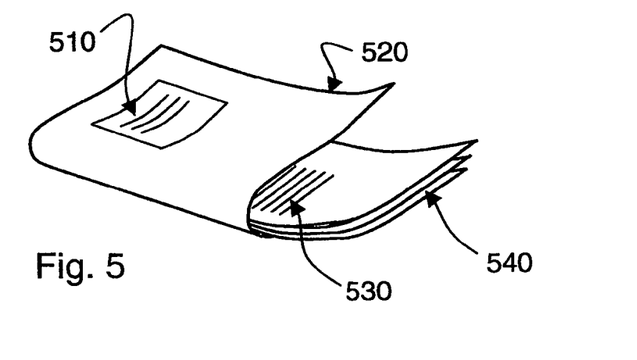
FIG. 5 shows an email item and an attached document as printed according to an embodiment of the present invention.

In a specific embodiment of the present invention, an email item stored in the document email server and shown in the related email folder of a client may be "printed" using the conventional print key of the email client. In that case, the email item itself and the attached digital document file are placed in the user's Mailbox as a print job, and when that print job is started, both the email item itself and the attached digital document are printed in series. As shown in FIG. 5, this may be done in a special way, depending on the capabilities of the particular printer, namely, by automatically printing the email item 510 itself on a larger sheet 520, e.g. A3 where the normal print process uses A4, and the attached document contents 530 on normal sheets 540, in this example A4, so that the large sheet 520 may be folded as a folder or "file wrapper" wherein the printed document can be accommodated. If the printer is not suitable for printing A3, a single normal sheet may be used in the same way as a banner page. The "folder" form would be even more handy in situations where an email item has several attached digital documents. In this way, a dossier may be compiled by attaching several document files to one email item. In the local printer user interface, as shown in exemplary form in FIG. 6, the email body 610 and the attachment or attachments 620 may be shown grouped together in the job list on the console display 410 and can be selected at once and printed with a single command. Alternatively, the folder 520 may be printed with the names and possibly other particulars of the individual digital documents making up the set, instead of the contents of the associated email item.

Figure 6:
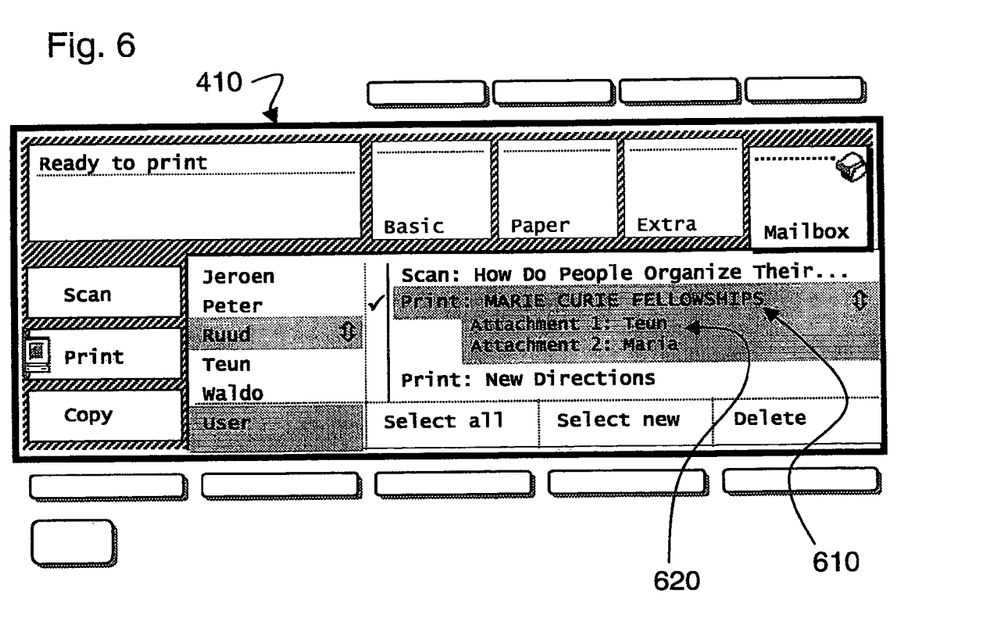
FIG. 6 shows a display layout of the operator control panel.

Also, scanning may be implemented in this specific embodiment. A set of documents may be scanned with the intention to attach the scan files to a single email item as multiple attachments. This may for instance be implemented by physically consolidating the hard-copy documents with machine-recognizable separation sheets in between. Such machine-recognizable separation sheets may have a specific color or specific patterns such as bar codes printed on them. The complete set is then scanned, wherein the separation sheets are automatically recognized by the scanner software, and a new scan file is defined each time a separation sheet is recognized. Upon completion of the scan process, the scan files are stored in the user's Mailbox as associated files. They are presented on the local device display in much the same way as the print job with multiple attached print files as shown in FIG. 6. Also, an email item is automatically created in the document email server and the scan files are attached thereto as separate attachments.

It will be appreciated that a digital document can be created in the Mailbox by creating a new email item with the document as an attachment. Furthermore, a digital document for printing can be created by conventional print operations in an application program, such as Microsoft Word®. The document to be printed is then submitted to the control system 140 via the print service, where it is stored in the Mailbox of the user. The control system 140 then creates a corresponding email item in response to receiving the document. The user may then use the email item and its attachment for document management in activities-dedicated email folders. Moreover, the user may also track any status changes of the digital document.

It will be appreciated that a digital document can be represented with a single email item that is updated to reflect the actual status. No new additional email needs to be created in the folder each time the status of the document changes, resulting in more than one email for one digital document. Upon a change of the email as a result of a status change of the document, the email will automatically be highlighted as unread. Alternatively, other attention catching elements such as setting a flag icon may be used explicitly. In this way, the user can easily identify jobs whose status has recently changed. It will also be clear from FIG. 3 that a user can quickly get an overview of jobs for a plurality of document processing. Currently, Microsoft® Exchange already provides the functionality for such an 'update' of an email item. Using IMAP, the same effect can be achieved by deleting the current email item and generating substantially simultaneously a new email item with the new status. In this way no obsolete information is presented in the email folder.

It will be appreciated that the present invention also extends to computer programs in which the method of the present invention is implemented, particularly computer programs on or in a carrier. The program may be in the form of source code, object code, a code intermediate source and object code such as a partially compiled form, or in any other form suitable for use in the implementation of the method according to the present invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal that may be conveyed via an electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the present invention. Those skilled in the art will be able to design many alternative embodiments without departing from the scope of the appended claims. In the claims, the use of the verb "comprise" and its conjugations does not exclude the presence of elements or steps other than those stated in a claim. The article "a" or "an" preceding an element does not exclude the presence of a plurality of such elements. The present invention may be implemented by hardware that includes several distinct elements, and by a suitably programmed computer. In the device claim enumerating several devices or elements, several of these means may be embodied by one and the same item of hardware. The mere fact that certain measures are recited in mutually different dependent claims does not indicate that a combination of these measures cannot be used to advantage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for handling digital documents in a digital document processing system, wherein the digital document processing system includes a control system having a document storage for the digital documents, a dedicated document email server that stores email items, wherein each email item is linked to a corresponding digital document in the document storage and where each email item stores the corresponding digital document's processing status, at least one document processing device connected to the control system, and a plurality of user workstations that each include a respective email client, wherein the plurality of user workstations and the control system include respective devices that enable bi-directional communication through a network, the method comprising the steps of:

storing and managing the digital documents in the document storage, wherein each of the digital documents are owned by one of the users of the plurality of user workstations;

operating the dedicated document email server to generate and maintain therein a respective email item for each digital document in the document storage;

accessing the generated email items using the respective email client on the plurality of user workstations, wherein the respective email client includes a dedicated email folder coupled to a particular user account in the dedicated document email server;

using the at least one document processing device to perform a document processing operation on one of the digital documents in the document storage that changes the digital document's processing status; and     updating the stored corresponding digital document's processing status in the generated email item in the dedicated document email server and the document storage, wherein the updating dynamically reflects the one of the digital document's actual changed processing status.

2. The method according to claim 1, further including a step of synchronizing the document storage and the dedicated document email server, wherein the synchronizing dynamically reflects manipulation of an email item in the dedicated email folder of an email client in the document processing operation on the corresponding digital document.

3. The method for handling digital documents of claim 1, wherein the updating step is accomplished without a need to create a new email item when the digital document's processing status changes.

4. A digital document processing system, comprising:

a plurality of workstations, each of the workstations including a respective email client;

a control system; and at least one document processing device connected to the control system, wherein the plurality of user workstations and the control system include respective devices that enable bi-directional communication through a network, wherein the control system includes:

a document storage that stores and manages digital documents related to a document processing operation in the at least one document processing device, where each of the digital documents are associated with a user of the plurality of workstations;

a dedicated document email server that stores email items, wherein each email item is linked to a corresponding digital document in the document storage and where each email item stores the corresponding digital document's processing status; and     a processor that executes instructions stored on a tangible computer readable storage medium to perform the steps of:

storing and managing the digital documents in the document storage and informing the user on a digital document processing status of at least one of each of digital file documents associated with the user;

operating the dedicated document email server to generate and maintain therein a respective email item for each digital document in the document storage;

accessing the generated email items using the respective email client on the plurality of user workstations, wherein the respective email client includes a dedicated email folder coupled to a particular user account in the dedicated document email server;

using the at least one document processing device to perform a document processing operation on one of the digital documents in the document storage that changes the digital document's processing status; and     updating the stored corresponding digital document's processing status in the generated email item in the dedicated document email server and the document storage, wherein the updating dynamically reflects the one of the digital document's actual changed processing status.

5. The digital document processing system according to claim 4, wherein an email item and a digital document are linked by way of a copy of the digital document being attached to the email item.

6. The digital document processing system according to claim 4, wherein the processor also synchronizes the document storage and the dedicated document email server, wherein the synchronizing dynamically reflects manipulation of an email item in the dedicated email folder of a respective email client in the document processing operation on the corresponding digital document.

7. The digital document processing system according to claim 6, wherein an email item and a digital document are linked by way of a copy of the digital document being attached to the email item.

8. The digital document processing system according to claim 6, wherein the processor synchronizes with the dedicated document email server to detect the manipulation of the email item in the dedicated document email server and in response changing the digital document processing status of the corresponding digital document associated with the email item in dependence on the manipulation.

9. The digital document processing system according to claim 8, wherein the processor deletes the corresponding digital document in the document storage in response to determining that the email item associated with the corresponding digital document has been removed from the dedicated email folder associated with the user of the plurality of workstations.

10. The digital document processing system according to claim 8, wherein the processor creates a digital document in the document storage in response to determining that an email item has been inserted in the dedicated email folder associated with a the user of the plurality of workstations.

11. The digital document processing system according to claim 6, wherein the at least one document processing device includes a digital document scan system and the processor creates an email item in the dedicated document email server in response to a the user of the plurality of workstations creating a scan job, where an attachment to the created email item includes a digital document generated by the digital document scan system.

12. The digital document processing system according to claim 4, wherein the at least one document processing device includes a digital document print system provided with a local user interface and wherein the processor updates the stored corresponding digital document's processing status in the document storage in response to the user of the plurality of workstations creating a print job relating to the one of the digital documents at the local user interface.

13. The digital document processing system according to claim 6, wherein the at least one document processing device includes a digital document copy system including a scanner and a printer and the processor creates an email item in the dedicated document email server in response to the user of the plurality of workstations creating a copy job, where an attachment to the created email item includes a digital document generated by the scanner.

14. The digital document processing system according to claim 4, wherein the at least one document processing device has a local user interface for commanding operations involving digital documents, the local user interface is connected to the control system for manipulating digital documents stored in the document storage.

15. The digital document processing system according to claim 4, wherein the processor indicates a type of digital document in a field of the linked email item.

16. The digital document processing system according to claim 4, wherein the processor extracts title of the stored digital document and stores it in a field of the linked email item.

17. The digital document processing system according to claim 4, wherein the processor extracts content of the stored digital document and to stores it in a field of the linked email item.

18. The digital document processing system according to claim 4, wherein the processor stores a time of submission of the stored digital document in a field of the linked email item.

19. The digital document processing system of claim 4, wherein the processor updates the dedicated document email server and the document storage without a need to create a new email item when the digital document's processing status changes.

20. A tangible computer readable storage medium encoded with instructions, executed by a computer processor to perform a method for handling digital documents in a digital document processing system, wherein the digital document processing system includes a control system having a document storage for the digital documents, a dedicated document email server that stores email items, wherein each email item is linked to a corresponding digital document in the document storage and where each email item stores the corresponding digital document's processing status, at least one document processing device connected to the control system, and a plurality of user workstations that each include a respective email client, wherein the plurality of user workstations and the control system include respective devices that enable bi-directional communication through a network, the method comprising the steps of:

storing and managing the digital documents in the document storage, wherein each of the digital documents are owned by one of the users of the plurality of user workstations;

operating the dedicated document email server to generate and maintain therein a respective email item for each digital document in the document storage;

accessing the generated email items using the respective email client on the plurality of user workstations, wherein each email client includes a dedicated email folder coupled to a particular user account in the dedicated document email server;

using the at least one document processing device to perform a document processing operation on one of the digital documents in the document storage that changes the digital document's processing status; and updating the stored corresponding digital document's processing status in the generated email item in the dedicated document email server and the document storage, wherein the updating dynamically reflects the one of the digital document's actual changed processing status.

21. The tangible computer readable storage medium according to claim 20, wherein the instructions cause the processor to perform a further step of synchronizing the document storage and the dedicated document email server, wherein the synchronizing dynamically reflects manipulation of an email item linked with a digital document in the dedicated email folder of an email client in the document processing operation of the digital document processing system on the corresponding digital document.

22. The tangible computer readable storage medium of claim 20, wherein the updating step is achieved without a need to create a new email item when the digital document's processing status changes.

\* \* \* \* \*